(12) United States Patent
Narayanan

(10) Patent No.: US 12,529,724 B2
(45) Date of Patent: Jan. 20, 2026

(54) CAPACITANCE-BASED DETECTION OF PROBE CONTACT

(71) Applicant: FEI Company, Hillsboro, OR (US)

(72) Inventor: Shyam Sundar Aswadha Narayanan, Richardson, TX (US)

(73) Assignee: FEI Company, Hillsboro, OR (US)

( * ) Notice: Subject to any disclaimer, the term of this patent is extended or adjusted under 35 U.S.C. 154(b) by 321 days.

(21) Appl. No.: 18/320,882

(22) Filed: May 19, 2023

(65) Prior Publication Data

US 2024/0385238 A1    Nov. 21, 2024

(51) Int. Cl.
*G01R 31/28* (2006.01)
*G01R 1/067* (2006.01)
*G01R 27/26* (2006.01)

(52) U.S. Cl.
CPC ..... *G01R 31/2889* (2013.01); *G01R 1/06738* (2013.01); *G01R 27/2605* (2013.01)

(58) Field of Classification Search
CPC ........ G01R 27/00; G01R 27/02; G01R 27/26; G01R 31/00; G01R 31/28; G01R 31/2832; G01R 31/2836; G01R 31/2846; G01R 31/2851; G01R 31/2855; G01R 31/286; G01R 31/2863; G01R 31/2872; G01R 31/2879; G01R 31/2886; G01R 31/2887; G01R 1/00; G01R 1/06; G01R 1/067; G01R 1/06711; G01R 1/06733; G01R 1/073; G01R 1/07307; G01R 27/2605; G01R 31/2889; G01R 1/07364
USPC .......... 324/500, 537, 754.01, 754.03, 754.07
See application file for complete search history.

(56) References Cited

U.S. PATENT DOCUMENTS

| 4,195,259 | A  | * | 3/1980  | Reid            | G01R 1/073   |
|           |    |   |         |                 | 324/750.19   |
| 7,768,283 | B1 | * | 8/2010  | Patterson       | G01R 1/0408  |
|           |    |   |         |                 | 324/754.08   |
| 8,441,272 | B2 | * | 5/2013  | Pagani          | G01R 1/06716 |
|           |    |   |         |                 | 324/755.07   |
| 9,766,266 | B2 | * | 9/2017  | Sadeghian Marnani | ........... |
|           |    |   |         |                 | G01Q 10/06   |
| 2005/0225345 | A1 | * | 10/2005 | Mazur        | G01R 31/2648 |
|           |    |   |         |                 | 324/754.03   |

(Continued)

FOREIGN PATENT DOCUMENTS

KR    20080077952 A  *  8/2008   ......... G01R 31/2891

OTHER PUBLICATIONS

Kang et al. "Depth Dependent Carrier Density Profile by Scanning Capacitance Microscopy" Sep. 15, 1997, American Institute of Physics, vol. 71, No. 11, pp. 1546-1548.

(Continued)

*Primary Examiner* — Hoai-An D. Nguyen
(74) *Attorney, Agent, or Firm* — Leron Vandsburger

(57) ABSTRACT

Techniques for detecting contact of a probe on a surface are described. A computer-implemented method for detecting nanoscale contact of a probe tip on a surface includes positioning a probe tip at a first displacement relative to a sample surface, the sample surface exposing one or more nanostructures. The method can include displacing the probe tip toward the sample surface. The method can include generating response data for the probe tip based at least in part on one or more electrical properties of the probe tip. The method can also include detecting a contact between the sample surface and the probe tip using the response data.

20 Claims, 5 Drawing Sheets

(56) References Cited

U.S. PATENT DOCUMENTS

| | | | | |
|---|---|---|---|---|
| 2008/0149832 A1* | 6/2008 | Zorn | ................... | G01Q 10/045 |
| | | | | 977/869 |
| 2023/0168278 A1* | 6/2023 | Jung | ................... | G02B 27/283 |
| | | | | 324/537 |

OTHER PUBLICATIONS

Kopanski et al. "Comparison of Measured and Modeled Scanning Capacitance Microscopy Images Across p-n Junctions" AIP Conference Proceedings, 1998, vol. 449, pp. 725-729.

"Scanning Capacitance Microscopy (SCM)" first available on Jul. 16, 2020 from:https://www.parksystems.com/park-spm-modes/94-electrical-properties/235-scanning-capacitance-microscopy-scm, 4 pages.

"Scanning Capacitance Microscopy: How it Works" first available on Jan. 11, 2017 from: https://www.nrel.gov/materials-science/scanning-capacitance.html, 2 pages.

* cited by examiner

CAPACITANCE-BASED DETECTION OF PROBE CONTACT

TECHNICAL FIELD

Embodiments of the present disclosure are directed to electronic testing systems, as well as algorithms and methods for their operation. In particular, some embodiments are directed toward techniques for integrated circuit testing and diagnostics.

BACKGROUND

Integrated circuit (IC) testing involves measurement of individual transistors or groups of transistors of a semiconductor wafer or wafer section (e.g., a diced wafer), termed a "device under test" or DUT. Typically, probes are positioned in contact with integrated circuit elements and used to interrogate the DUT while the DUT is powered and driven with a time-varying electrical signal, referred to as a test loop. With increasing feature density and structural complexity of integrated circuits, placing probes onto specific IC elements involves precise positioning of nanoscale probe tips and developing nanoscale information for the probe tip position in three dimensions. Such precise positioning is a significant challenge for "open loop" positioning systems, for which a position of the probe tip is known to within a tolerance. The inexact location of the probe tip makes contact with the surface difficult to predict. This difficulty is attributable at least in part to two sources of error: i) uncertainty in the distance between the probe tip and the surface; and ii) uncertainty in the position of the probe tip with respect to an internal mechanical coordinate system referenced by the probe. Imaging techniques, such as localizing the probe tip in an image relative to a background of the DUT, are typically employed for that purpose. Such techniques suffer from inaccuracy introduced by the density of features on a typical DUT surface, making localizing the probe difficult.

While technically possible, precise positioning of probe tips onto conducting contacts at the nanometer scale, corresponding to a characteristic feature size of current CMOS nodes, using a closed loop system (e.g., with a known DUT surface position) significantly increases the complexity and the cost of probe positioner control systems. As a result, it is impractical to implement closed loop positioning on the scale at which testing platforms are deployed. There is a need, therefore, for improved probe tip localization and contact detection for IC testing systems.

BRIEF SUMMARY

In one aspect, a computer-implemented method for detecting nanoscale contact of a probe tip on a surface includes positioning a probe tip at a first displacement relative to a sample surface, the sample surface exposing one or more nanostructures. The method can include displacing the probe tip toward the sample surface. The method can include generating response data for the probe tip based at least in part on one or more electrical properties of the probe tip. The method can also include detecting a contact between the sample surface and the probe tip using the response data.

The response data can include frequency data, amplitude data, voltage data, current data, or Q-factor data. The response data can include phase-shift data, and wherein detecting the contact comprises detecting a phase shift greater than or equal to a threshold value. The threshold value can be about $\pi/2$ radians, fractions thereof, or multiples thereof. The response data can include dissipation factor data, and detecting the contact can include detecting a change in sign of the dissipation factor. The method can further include detecting a second displacement of the probe tip relative to the sample surface for which a rate of change of the dissipation factor is negligible or zero between the first displacement and the second displacement and the rate of change of the dissipation factor is positive beyond the second displacement. Displacing the probe tip can include displacing the probe tip by a first displacement rate between the first displacement and the second displacement and displacing the probe tip by a second displacement rate between the second displacement and the sample surface. The second displacement rate can be different from the first displacement rate.

The method can further include applying a voltage signal to the probe tip, the voltage signal being a periodic AC signal, an aperiodic AC signal, or a DC signal. The voltage signal can have a frequency from about 20 Hz to about 2 MHz or 600 MHz to about 3 GHz. The voltage signal can include a first segment having a first frequency and a second segment having a second frequency. Detecting the contact can include comparing response data for the first segment with response data for the second segment. The method can further include determining whether the surface of the sample is dielectric or conducting based at least in part on a comparison of the response data for the first segment with the response data for the second segment. The voltage signal can include a DC bias from about 100 mV to about 40V. The voltage signal can be applied to the sample and can emanate an electric field from the sample surface. The nanostructures can include a quantum dot. The nanostructures can include an integrated circuit feature.

In one aspect, a system for electrical characterization of integrated circuit components includes a probe defining a probe tip. The probe tip can have a characteristic dimension less than or equal to 10 nm at a terminal surface. The system can include an electronic test system electronically coupled with the probe. The electronic test system can include control circuitry and one or more non-transitory machine-readable storage media, electronically coupled with the control circuitry. The media can be storing instructions that, when executed by the control circuitry, cause the electronic test system to perform operations of the method of the preceding aspect. The operations can include positioning the probe tip at a first displacement relative to a sample surface, the sample surface exposing an integrated circuit component, displacing the probe tip toward the sample surface, applying a voltage signal to the probe tip, generating response data for the probe tip based at least in part on a response of the probe tip to the voltage signal, and detecting a contact between the sample surface and the probe tip using the response data.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed can be resorted to by those skilled in the art, and that such modifications and variations are considered to be within the scope of this disclosure as defined by the appended claims.

BRIEF DESCRIPTION OF THE SEVERAL VIEWS OF THE DRAWINGS

The foregoing aspects and many of the attendant advantages of the present disclosure will become more readily appreciated as the same become better understood by reference to the following detailed description, when taken in conjunction with the accompanying drawings.

Figure 1:
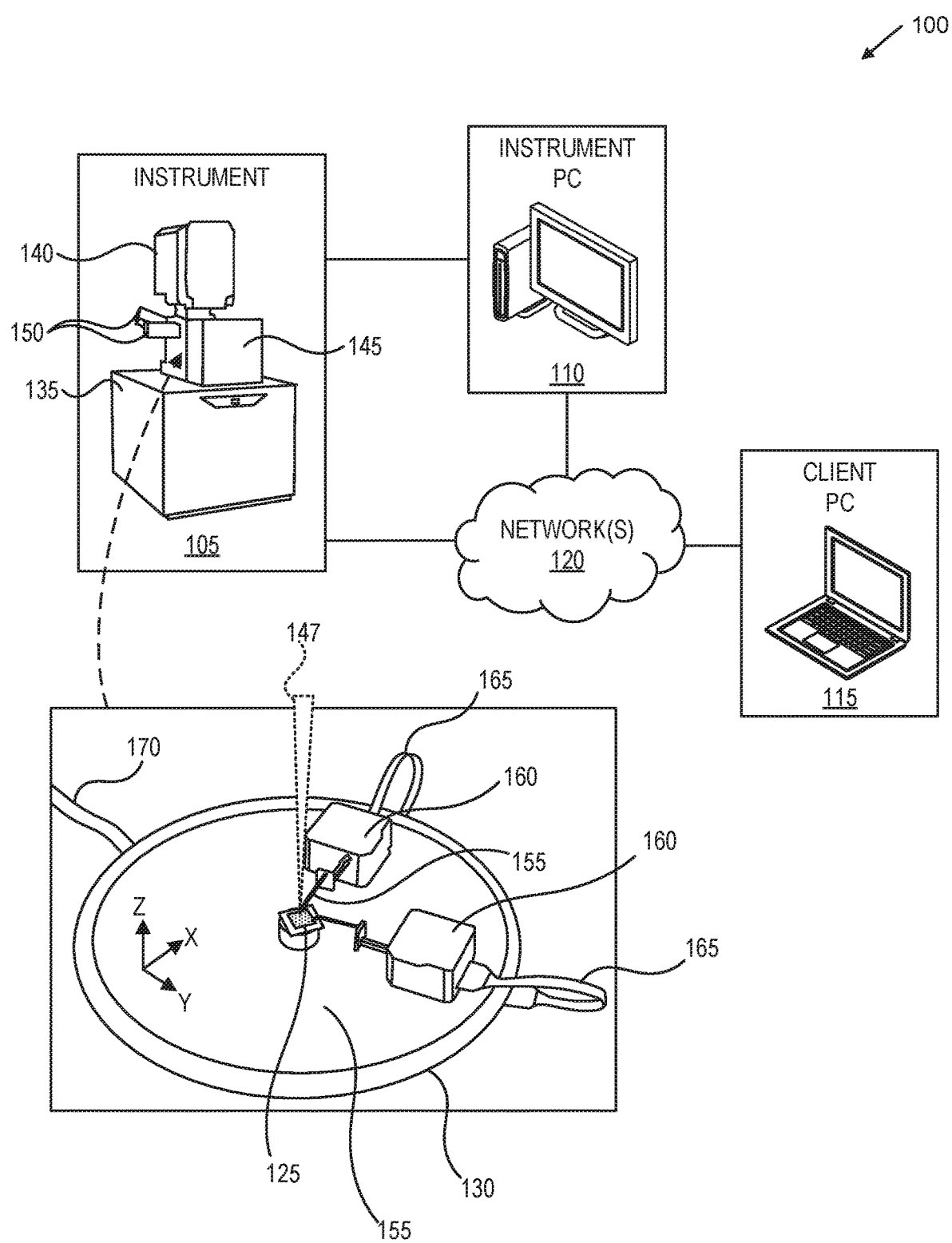
FIG. 1 is a schematic diagram illustrating an example integrated circuit testing system, in accordance with some embodiments of the present disclosure.

In the drawings, like reference numerals refer to like parts throughout the various views unless otherwise specified. Not all instances of an element are necessarily labeled to reduce clutter in the drawings where appropriate. The drawings are not necessarily to scale, emphasis instead being placed upon illustrating the principles being described.

DETAILED DESCRIPTION

While illustrative embodiments have been illustrated and described, it will be appreciated that various changes can be made therein without departing from the spirit and scope of the disclosure. In the forthcoming paragraphs, embodiments of an analytical instrument system, components, and methods to detect contact between the probe tip and a surface are described. Embodiments of the present disclosure focus on integrated circuit characterization and failure analysis in the interest of simplicity of description. Embodiments are not limited to such instruments, but rather are contemplated for analytical instrument systems configured for localization and positioning of nanoscale electromechanical elements. In an illustrative example, materials that exhibit nanoscale heterostructures (e.g., nanostructures, nanoparticles, nanowires, nanosheets, nanoflakes, etc.), such as quantum dot composite materials used for information and/or energy storage, can benefit from improved localization of nanoscale electromechanical components that are otherwise difficult to position with suitable precision, given the characteristic length scales of quantum dots on the order of 1 nm-10 nm.

Embodiments of the present disclosure include systems, methods, algorithms, and non-transitory media storing machine-readable instructions for detecting a contact between a probe tip and a sample surface. In an illustrative example, a method can include positioning a probe tip at a first displacement relative to a sample surface, where the sample surface exposes an integrated circuit component. The method can include displacing the probe tip toward the sample surface and applying a periodic voltage signal to the probe tip. The method can include generating capacitance data for the probe tip based at least in part on a response of the probe tip to the periodic voltage signal. The method can also include detecting a contact between the sample surface and the probe tip using the capacitance data. Technical advantages of the present disclosure include improved detection of contact between nanoscale probe tips with surfaces without detailed information about sample surface position, as well as improved performance of integrated circuit evaluation platforms. While description focuses on capacitance-based techniques, such as those associated with measuring a dissipation factor, techniques of the present disclosure include generating data such as Q-factor data, voltage/current data, and periodic information, such as frequency shift data, phase shift data, and/or amplitude shift data.

Integrated circuit testing involves measurement of individual transistors or groups of transistors of a semiconductor wafer or wafer section (e.g., a diced wafer), termed a "device under test" or DUT. Typically, probes are positioned in contact with integrated circuit elements and used to interrogate the DUT with an electrical signal. The electrical signal can be periodic AC, aperiodic AC, and/or DC, over the course of a test. One or more probes are used as inputs and one or more probes are used as outputs to measure the response of the IC elements to the periodic signal. With increasing feature density and structural complexity of integrated circuits, placing probes onto specific IC elements involves nanoscale geometries of probe tips and nanoscale information for the probe tip position. Such precise positioning is a significant challenge for "closed loop" positioning systems (e.g., registered piezoelectric actuators). While technically possible, precise positioning of probe tips onto conducting contacts at the nanometer scale, corresponding to a characteristic feature size of current CMOS nodes, increases the complexity of control systems to an extent that it is impractical at the scale on which testing platforms are deployed.

In place of complex closed-loop systems, embodiments of the present disclosure leverage the availability of electronic systems (e.g., arbitrary waveform generators, voltmeters, or the like) to detect probe contact with a sample surface. Relative to existing techniques, embodiments of the present disclosure improve such detection at least in part based on monitoring one or more electronic properties of the probe, revealing the influence of contact and proximity with the surface on the electronic properties of the probe. As an illustrative example, a contact between the probe tip and the surface can be detected at least in part by a change in sign in a dissipation factor characteristic of the probe, generated by measuring a response signal from the probe in response to the application of a voltage signal to the probe and/or to the sample. As described in more detail in reference to FIGS. 1-6, embodiments of the present disclosure permit a probe tip to be precisely lowered onto nanoscale integrated circuit features, without detailed knowledge of the exact position of the surface of the IC or the geometry of the probe.

FIG. 1 is a schematic diagram illustrating an example integrated circuit (IC) testing system 100, in accordance with some embodiments of the present disclosure. The example system 100 includes an instrument 105, an instrument computing device (IPC) 110, and a client computing device 115, operably intercoupled via one or more networks 120. The example system 100 is configured to interrogate an IC device, termed a device under test (DUT) 125 using one or more probe assemblies 130 electronically coupled with components of the DUT 125 via a controller, also referred to as a test rig. Through application of time-varying electronic signals to components of the DUT 125, termed a "test loop," performance characteristics of circuit components of the DUT 125 can be derived as part of quality control and failure analysis techniques for ICs fabricated according to a given IC design.

The instrument 105 includes a vacuum chamber 145 in which the probe assembly 130 is disposed, including the DUT 125. An instrument section 135 can include electronic components to drive the test loop, vacuum components to isolate the DUT 125 from atmosphere, and thermal management systems to remove heat from the DUT 125 during testing. Coupled with the instrument section 135 are a charged particle column 140 and the vacuum chamber 145. The charged particle column 140 can be an ion beam (e.g., focused ion beam (FIB)) column and/or an electron beam column. In some embodiments, the instrument 105 includes a FIB column and an electron beam column with one of the charged particle sources being coupled with the vacuum chamber 145 at an angle relative to the charged particle column.

An electron beam column can generate a beam of electrons 147 and focus the beam of electrons 147 onto the DUT 125. The interaction of the beam of electrons 147 with the DUT 125 gives rise to one or more detectable signals, which can be received by one or more detectors 150 operably coupled with the vacuum chamber 145 and configured to generate detector data based at least in part on measurement of the signal(s). In an illustrative example, the detector(s) 150 can include secondary electron detectors, backscattered electron detectors, photon detectors, imaging sensors (e.g., CCDs) or the like. In contrast to a typical scanning electron microscope (SEM), the vacuum chamber 145 can omit sample manipulation tools, such as an interlock, bulk stage, and the like, at least in part because the DUT 125 can be removably coupled with the probe assembly 130, which can be disposed on a stage, a cradle, or other retention assembly that provides electronic and thermal coupling with the instrument section.

The probe assembly 130 can include individually addressable probes 155, movable in three spatial dimensions (labeled with "x-y-z" cartesian axes) by electromechanical actuators 160. In this way, probe tips (labeled 206 in reference to FIGS. 2-4) can be displaced toward a position on the surface of the DUT 125 with nanometer-scale precision. In some embodiments, the probe assembly 130 is electronically coupled with components of the vacuum chamber 145 and/or the instrument section 135 via couplings 165 and 170, by which the actuators 160 can be driven and the test loop signals can be applied to the DUT 125.

Based at least in part on challenges associated with calibrating a reference position of the DUT 125 surface (e.g., defining z=0 to be the surface of the DUT 125), vertical displacement of the probes 155 can be measured in reference to a calibration displacement (e.g., a return or "zero" displacement) that is independent of the type of DUT 125. To that end, example system 100 can implement open-loop positioning of the probes 155, referring to an approach by which the position of the probes 155 is known in reference to the calibration displacement, adjusted by any subsequent displacements (e.g., a starting point in three-dimensional coordinates with each subsequent displacement added as a vector of three displacement values). In some cases, the lateral (e.g., "x-y") position of the probe(s) 155, relative to the surface of DUT 125, can be determined using detector data, such as secondary electron images, generated by directing the beam of electrons 147 at a region of the DUT 125 or at one or more of the probes 155. A rough estimate of the vertical "Z" displacement of the probe with respect to the sample can be generated using electron beam focusing techniques, coupled with image processing algorithms (e.g., working distance and focal parameter variation). In some embodiments, the DUT 125 is processed by localized removal of one or more layers to expose the IC components or by localized deposition of materials for "editing" IC components using the FIB column.

The computing devices 110 and 115 can be general-purpose machines (e.g., laptops, tablets, smartphones, servers, or the like) that are configured to operate or otherwise interact with the instrument 105. The instrument 105, in turn, can include electronic components that form part of a special-purpose computing device, including control circuitry configured to drive the test loop, actuate the probe assembly 130, control the electron beam column 140, and operate the vacuum systems and thermal management systems. The IPC 110 can be a machine provided with software configured to interface with the instrument 105 and to permit a user of the instrument 105 to conduct a test of the DUT 125. Similarly, the client pc 115 can be configured to control one or more systems of the instrument 105 (e.g., via the IPC 110 and/or by interfacing with the instrument 105 over the network(s) 120) to conduct a test of the DUT 125. The instrument 105 can be a single physical unit, but can also include multiple physical units communicating over a local connection. For example, one or more cabinets including electronic systems can be coupled with the instrument section 135 to provide power, to generate test signals, to process outputs of the DUT 125, etc. In some embodiments, the instrument 105, the IPC 110, and/or the client PC 115 are in separate physical locations and are coupled via the network(s) 120 and/or by other means, such as direct connection or by wireless connection (e.g., near-field radio). The network(s) 120 can include public networks (e.g., the internet) and/or private networks (e.g., intranet or local area networks). In some embodiments, the IPC 110 and/or the client PC 115 is/are configured to operate the instrument autonomously (e.g., without human intervention) or semi-autonomously (e.g., with limited human intervention, such as initiating a test, identifying a sample, and/or confirming an automated analytical result). In this way, the example system 100 can be configured to operate with human control and/or autonomously, as part of a scalable IC characterization system for automated quality control of ICs.

Figure 2:
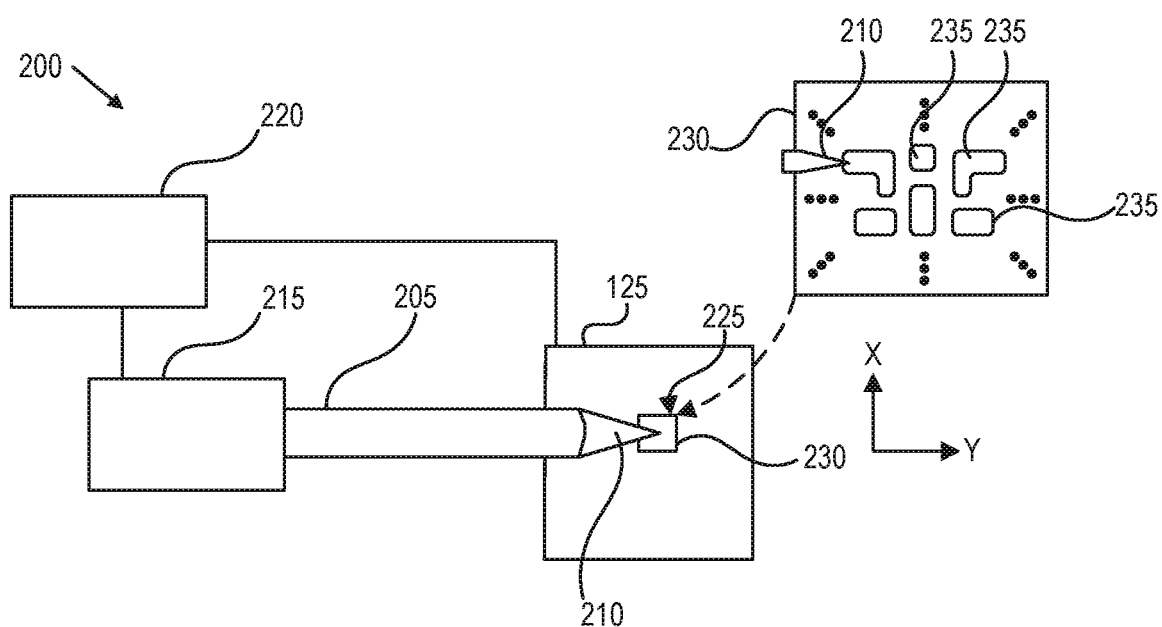
FIG. 2 is a schematic diagram illustrating an example integrated circuit testing probe in plan view, in accordance with some embodiments of the present disclosure.

FIG. 2 is a schematic diagram illustrating an example integrated circuit testing probe 200 in plan view, in accordance with some embodiments of the present disclosure. The probe 200 is an example of the probes 155 of FIG. 1. The probe 200 includes a probe arm 205 and a probe tip 210. The probe 200 also includes electromechanical actuator(s) 215 (e.g., actuators 160 of FIG. 1). The probe 200 can be operably coupled with control circuitry 220 (e.g., via couplings 165 and 170 of FIG. 1), as described in reference to FIG. 1.

Figure 3:
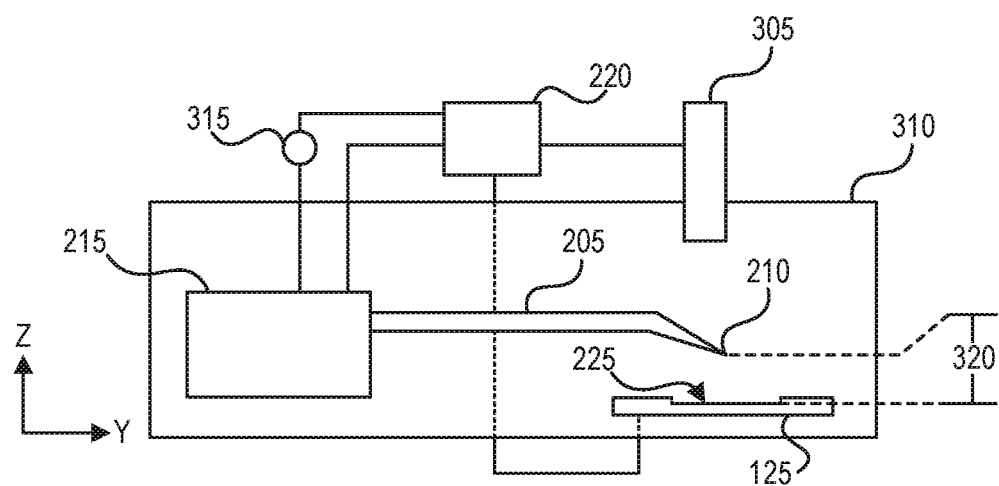
FIG. 3 is a schematic diagram illustrating an example integrated circuit testing probe in profile view, in accordance with some embodiments of the present disclosure.

The probe arm 205 and probe tip 210 can be fabricated from a conductive wire that has been shaped and sharpened to a point. As illustrated in FIG. 1 and FIG. 3, the probe tip 210 can be oriented at an angle relative to the probe arm 205, such that the tip 210 contacts the surface 225 of the DUT 125 in a target area 230. The probe tip 210 can taper to a terminal surface having a characteristic dimension on the same scale as one or more features 235 of the DUT 125 (e.g., on the order of 1-100 nm). For example, the probe tip can have a characteristic dimension less than or equal to about 10 nm at a terminal surface. The feature(s) 235 can be conductive and electronically coupled with one or more IC components (e.g., transistors, diodes, etc.).

The probe tip 210 can be brought into contact with the surface 225 at a feature 235, electronically coupling the control circuitry 220 with the DUT 125. The coupling can permit a probe 200 to apply at least part of a test signal to the DUT 125 through a feature 235. In some embodiments, multiple probes 200 are contacted with multiple respective features 235 on the surface 225 and deployed concurrently to apply the test signals and to measure output signals. An example configuration with multiple probes 200 is described in reference to FIG. 4.

The control circuitry 220 can drive the actuator(s) 215 in one or more directions, for example, by encoding a motion of the probe 200 as a vector of displacement values. The motion can include a component of linear motion (e.g., a linear displacement in one or more directions) and/or a component of periodic motion.

With open loop positioning systems, a displacement vector can be used to track the position of the probe tip 210 within a tolerance of about 10%, based at least in part on calibration of the positioning system. In this way, judging whether a contact of the probe tip 210 and the surface 225 has taken place can be prone to error. Similarly, raising the probe tip 210 from the surface (e.g., breaking contact) can be prone to error. Moving the probe tip 210 from one feature 235 to another feature 235 while the probe tip 210 is in contact with the surface 225 can damage the DUT 125 and/or the probe tip 210. As feature 235 sizes continue to shrink to the 1-10 nm scale, additional and/or alternative contact detection techniques are needed. Advantageously, techniques described herein permit detection of contact between the probe tip and the surface independently of the position of the probe tip 210 on the surface (e.g., not requiring an electrical contact with a precise point). Additionally, techniques described herein permit proximity of the surface 225 to be detected and, further, the conductivity of the surface 225 in proximity to the probe tip 210 to be determined prior to making contact.

The control circuitry 220 can include two types of circuitry. A first type of circuitry can be used to control the signals going to the probes. A second type of circuitry can be used to control the physical motion of the positioners/probes. The former can be from a single device, or a set of multiplexed devices. The control circuitry 220 can also be used to apply a voltage signal to the probe arm 205 and probe tip 210 and or to the DUT 125 and the surface 225. As described in reference to FIG. 6, the voltage signal can be periodic, applied at a frequency equal to or greater than about 20 Hz, such that proximity of the probe tip 210 to the surface 225 can be determined and whether the surface 225 is conductive or dielectric in the vicinity of the probe tip 210. For example, a periodic voltage signal can be applied at a voltage from about 20 Hz to about 2 MHz, including subranges, fractions, and interpolations thereof, to detect proximity to a conductive surface. In another example, the periodic voltage signal can be applied at a frequency from about 600 MHz to about 3 GHZ, including subranges, fractions, and interpolations thereof, to detect proximity to a dielectric surface. The control circuitry 220 can include one or more circuits configured to measure one or more response signals from the probe 200, in response to the periodic voltage signal. For example, the control circuitry 220 can be configured to monitor a measured capacitance at the probe 200 concurrent with a displacement of the probe tip 210 toward the surface 225. The probe 200 can be considered to be a capacitor with resistive properties (thus, not a pure capacitor), with a corresponding dissipation factor measurable from the response signals. The dissipation factor is a characteristic measure of a loss rate of energy in a mode of oscillation of a dissipative system. In mathematical terms, the dissipation factor, DF, is defined as follows:

$$DF = \frac{\sigma}{\varepsilon \omega} = \frac{1}{Q}$$

where $\sigma$ is the bulk conductivity of the probe 200, $\varepsilon$ is the lossless permittivity of the probe 200, and $\omega$ is the angular frequency of the periodic voltage signal ($\omega=2\pi f$). Q is the quality factor, which is a dimensionless parameter describing the extent of damping of an oscillator (e.g., a high Q factor indicates less damping). From the relation above, it can be seen that when free of the surface 225 and without a conductive contact, the bulk conductivity $\sigma$ is relatively small and the DF is relatively small, indicating a relatively high Q-factor and relatively low damping of the periodic voltage signal. In contrast, when contact with the surface 225 is made, the bulk conductivity of the probe 200 can increase, with a consequent increase in the dissipation factor. The lossless permittivity, $\varepsilon$, can depend at least in part on the angular frequency, $\omega$, physical characteristics of the medium between the probe and the bulk, and the magnitude and direction of the applied field at the probe tip 210, but is typically understood to vary relatively less than bulk conductivity with respect to contact with a conductive surface. In this way, detecting contact with a conducting surface can be relatively less sensitive to the values of $\varepsilon$ and $\omega$ than to the value of $\sigma$.

In vacuum/free space, until the probe 210 contacts the surface 225 or is in proximity to the surface 225, the dissipation in free space itself is negligible or zero. At contact, the measured conductivity can increase much more than the effective permittivity, resulting in a relatively large increase in measured dissipation factor. Before contact, the value of DF can be relatively insensitive to the position of the probe tip 210. In contrast, electromagnetic and/or electrostatic coupling of the probe tip 210 with the surface 225 can affect the strength of the electric field formed therebetween, which, in turn, can influence the value of $\sigma$. Where $\sigma$ increases in response to a change in magnitude of the electric field at the probe tip 210, the DF can increase. In some embodiments, the increase in DF can be relatively slight in comparison to the effect of contacting the surface 225. Even so, one or more signal processing operations, such as determining a rate of change parameter of the response signal (e.g., a delta parameter, a first derivative, second derivative, or the like) can be used to detect electromagnetic and/or electrostatic coupling between the probe tip 210 and the surface 225. The onset of coupling, in turn, can be used to detect proximity of the probe tip 210 to the surface 225, before contact is made.

Advantageously, detecting proximity to the surface 225 provides a check that the probe tip 210 is approaching the intended region of the surface 225. For example, the probe tip 210 can be positioned to make contact with a conductive feature 235. During touchdown of the probe 200, however, the tip can drift or the position of the probe tip can be different from the expected position. In this way, the contact can be made with a different feature 235 or with a dielectric portion of the surface 225. Detecting, or failing to detect, a conductive surface prior to contact can be discerned based at least in part on the response signal of the probe 200.

In some cases, one or more properties of the probe 200 can exhibit a frequency dependence. For example, permittivity, conductivity or capacitance as measured by the device can exhibit a relative minimum value in the ranges of frequency (f, in Hz) from about 10 MHz to about 10 GHz. The frequency of the periodic voltage signal can, therefore, be selected to be relatively more sensitive to dielectric regions of the surface 225. Where the bulk conductivity of the probe 200 does not increase on contact with the surface 225, as in the case of contact with a dielectric region, the influence of capacitance can be used to detect proximity and/or contact. Also, from the expression above, a relatively small value of permittivity can result in a relatively larger value of DF, and a relatively small change in the value of permittivity can have a relatively large influence on the value of DF. A dielectric material is characterized by a relatively low density of free/loosely bound electrons (e.g., in comparison to a conductor) to conduct direct current (DC). Such materials can be polarized by an applied electric field. Dielectric materials, such as Silicon, conduct AC signals more readily at higher frequency based at least in part on to the rapid switching of polarity. At higher frequencies, increased coupling with AC signals can result in increased dissipation losses from resistive effects, with consequent increase in dissipation factor.

FIG. 3 is a schematic diagram illustrating the example integrated circuit testing probe 200 of FIG. 2 in profile view, in accordance with some embodiments of the present disclosure. FIG. 3 shows the probe arm 205, the probe tip 210, the actuator(s) 215, the control circuitry 220, the surface 225 of the DUT 125, as described in more detail in reference to FIG. 2, as well as other components including an imaging system 305 (e.g., an electron microscope, a focused ion beam source, and/or an optical microscope), a vacuum chamber 310 (e.g., an example of vacuum chamber 145 of FIG. 1), and one or more sensors 315 operably coupled with the probe 200.

In FIG. 3 the surface 225 is shown recessed into the DUT 125 to reflect that typically the features 235 are formed internal to the DUT 125, and are revealed by selective removal of material from the DUT 125 (e.g., by ion-beam milling or other etching processes). The probe tip 210 is shown at a displacement 320 from the surface 225. In some embodiments, example processes of the present disclosure include applying the periodic voltage signal described in reference to FIG. 2 concurrent with displacing the probe tip 210 toward the surface 225. Sensor(s) 315 can monitor capacitance and/or related parameters of probe arm 205 and probe tip 210 (e.g., dissipation factor, DF). As displacement 320 decreases with the approach of the probe tip 210 toward the surface 225, the response signal(s) generated by the sensor(s) 315 can be stored, processed, and/or used by the control circuitry 220 to detect proximity of the probe tip 210 to the surface 225, contact of the probe tip 210 with the surface 225, etc.

Figure 4:
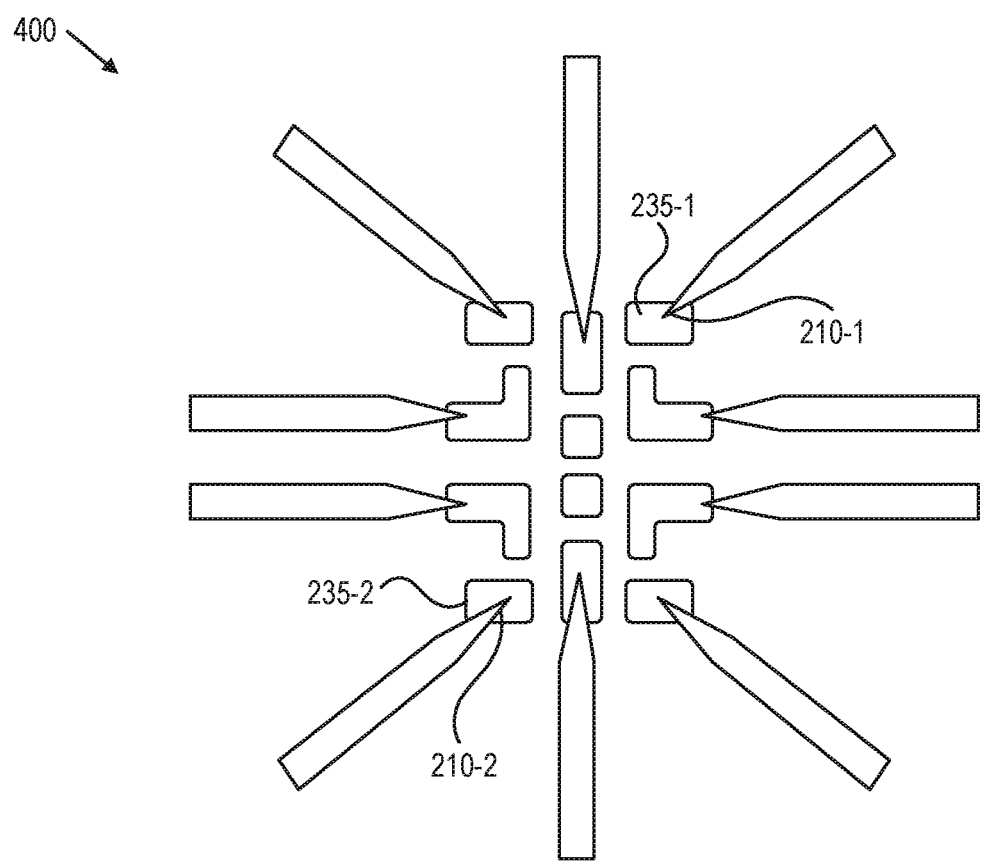
FIG. 4 is a schematic diagram illustrating an example integrated circuit testing system including multiple probes, in accordance with some embodiments of the present disclosure.

FIG. 4 is a schematic diagram illustrating an example integrated circuit testing system 400 including multiple probes, in accordance with some embodiments of the present disclosure. The probes of FIG. 4 are examples of the probes 155 and 200 of FIGS. 1-3. The system 400 illustrates ten individual probes that each make contact with a respective feature 235. For example, a first probe tip 210-1 can contact a first feature 235-1 and a second probe tip 210-2 can contact a second feature 235-2. The systems of the present disclosure can accommodate multiple probes, each individually employing the techniques described herein to detect proximity and/or contact with the surface of the DUT. The probe assembly (e.g., probe assembly 130 of FIG. 1) can accommodate 1-12 probes, including interpolations thereof.

Figure 5:
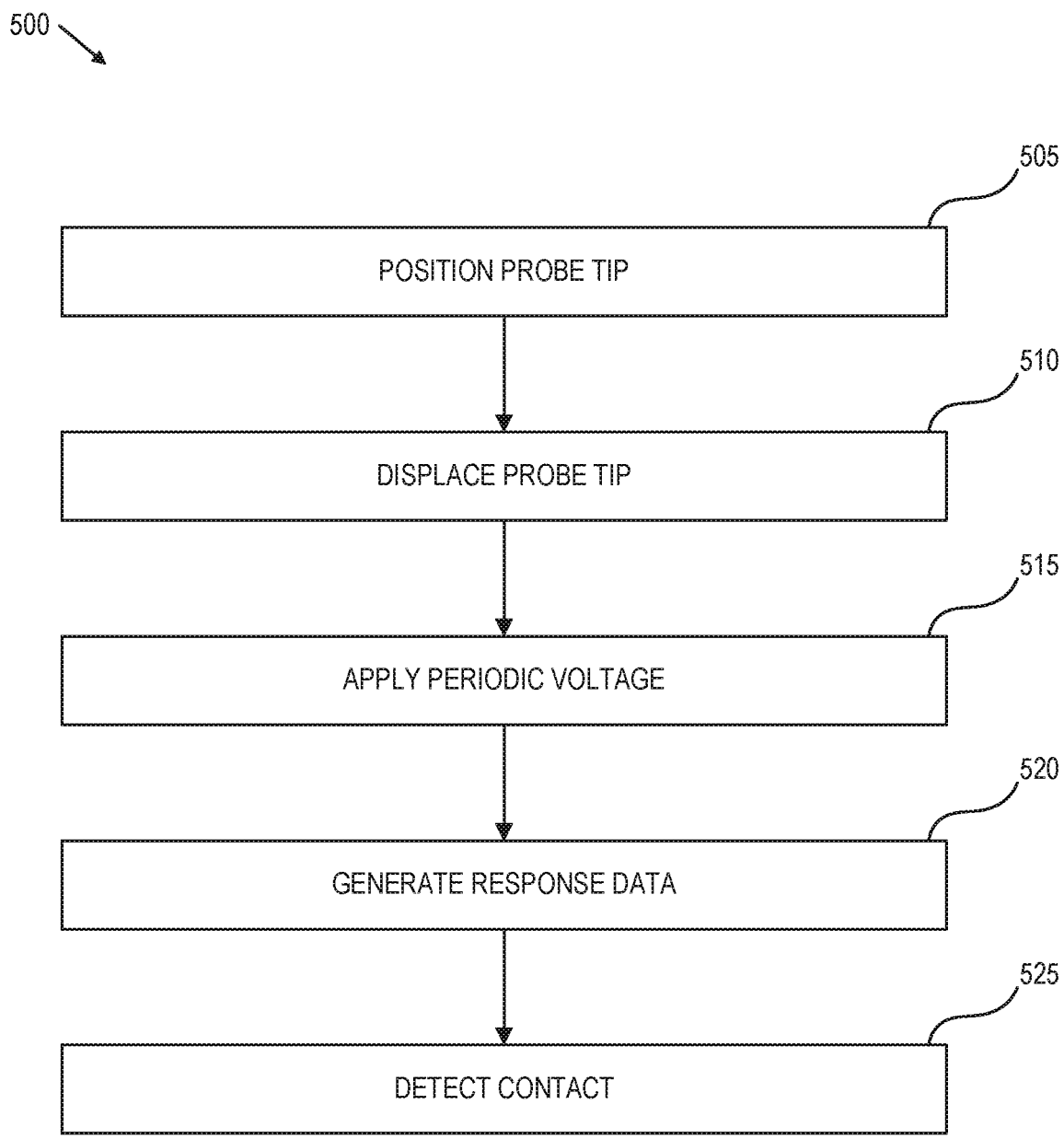
FIG. 5 is a block flow diagram illustrating an example process for detecting a contact between a probe tip and a surface, in accordance with some embodiments of the present disclosure.

FIG. 5 is a block flow diagram illustrating an example process 500 for detecting a contact between a probe tip and a surface, in accordance with some embodiments of the present disclosure. One or more operations of the example process 500 can be executed by a computer system in communication with additional systems including, but not limited to, characterization systems, network infrastructure, databases, and user interface devices. In some embodiments, at least a subset of the operations described in reference to FIG. 5 are performed automatically (e.g., without human involvement) or pseudo-automatically (e.g., with human initiation or limited human intervention). In an illustrative example, operations for positioning a probe tip, displacing the probe tip, applying a periodic voltage signal, and generating capacitance data can be executed automatically, with the system 100 being configured to generate visualization data showing one or more response signals for interpretation by a human user (example shown in FIG. 6).

In another illustrative example, a human user can initiate a touchdown procedure for a probe tip using the techniques described herein by activating the system 100 (e.g., through an interactive user environment presented through a user terminal, such as a browser or software application, and/or a push-button control panel). To that end, while example process 500 is described as a sequence of operations, it is understood that at least some of the operations can be omitted, repeated, and/or reordered. In some embodiments, additional operations precede and/or follow the operations of example process 500 that are omitted for clarity of explanation, for example, operations for calibration of the electron microscope, alignment and calibration of the probe(s) with respective features (e.g., features 235 of FIGS. 2-4) of the DUT (e.g., DUT 125 of FIGS. 1-4).

At operation 505, the example process 500 includes positioning a probe tip. The probe tip (e.g., probe tip 210 of FIGS. 2-4) can be positioned at a first displacement (e.g., displacement 320 of FIG. 3 and D1 of FIG. 6) relative to a sample surface (surface 225 of FIGS. 2-3). The sample surface can expose an integrated circuit component (e.g., feature(s) 235 of FIG. 2) that can be the target for contact with the probe tip. Positioning the probe tip at the first displacement can include moving the probe tip to a position substantially above the target IC component (e.g., in x-y space), with a vertical component (e.g., a z-axis coordinate) corresponding to the first displacement. The first displacement can correspond to a distance from the sample surface from about 0.5 µm to about 5 µm, including subranges, fractions, and interpolations thereof. In an illustrative example, the first displacement can correspond to a distance from the sample surface of about 2.5 µm.

At operation 510, the example process 500 includes displacing the probe tip toward the sample surface. Displacing the probe tip can include engaging one or more individually addressable actuators (e.g., electromechanical actuators 160 of FIG. 1). In this way, operation 510 can include engaging one or more actuators such that a vector describing the displacement of the probe tip is nonzero in a dimension substantially normal to the surface of the sample and about equal to zero in other dimensions. In the example of a three-coordinate displacement vector, operation 510 can include applying a vector (X,Y,Z)=(0, 0, z), which "z" being a nonzero number. In some embodiments, the x-y coordinates (or their equivalent) are determined in reference to an image of the sample surface.

Figure 6:
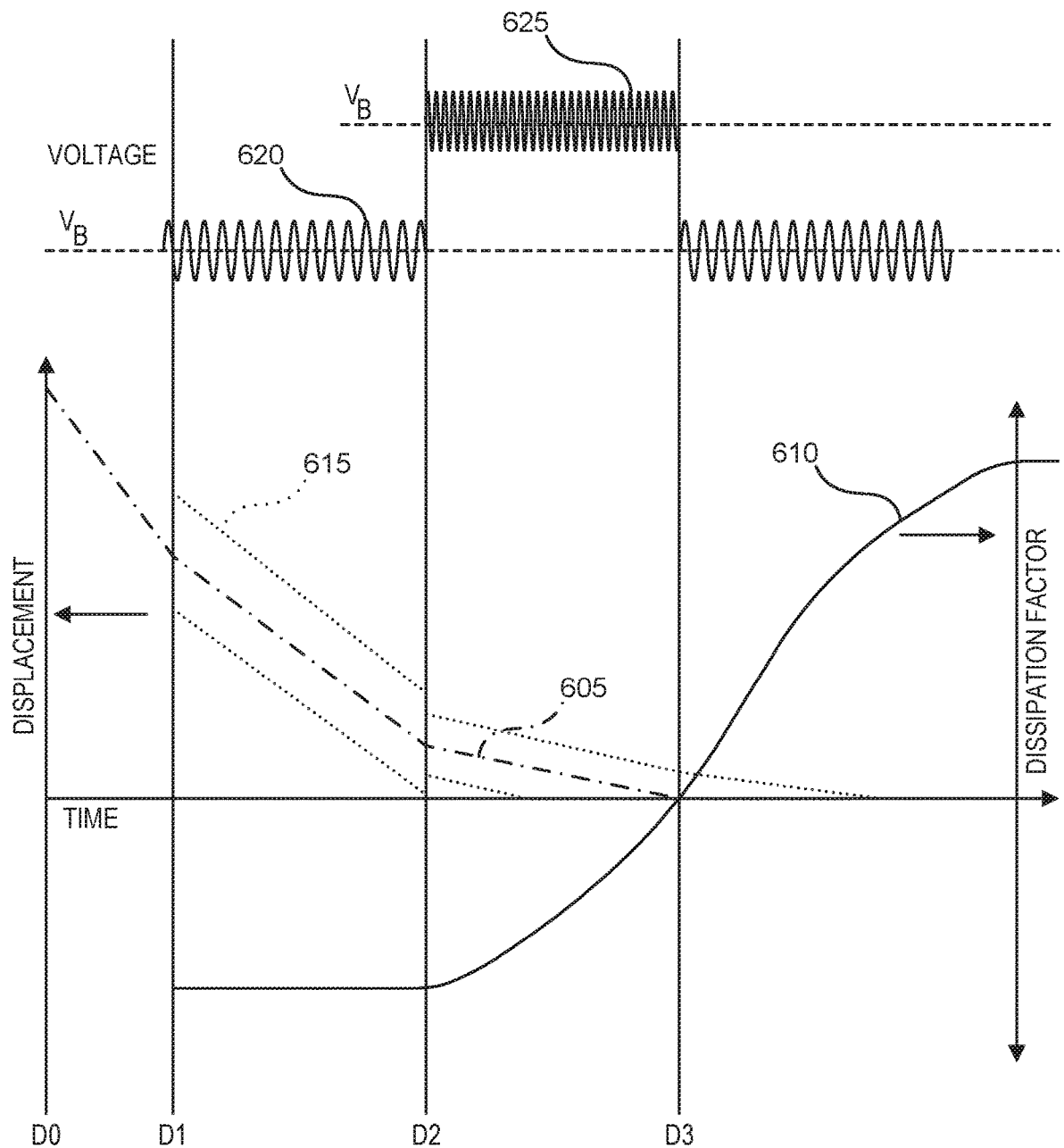
FIG. 6 is a composite graph showing example data for an integrated circuit testing system implementing the example process of FIG. 5, in accordance with some embodiments of the present disclosure.

As described in more detail in reference to FIG. 6, operation 510 can include applying one or more displacement rates for the z-motion of the probe tip. For example, a first "coarse" motion rate can be greater than a second "fine" motion rate. In some embodiments, operation 510 includes reducing the displacement rate in the z-axis from the "coarse" rate to the "fine" rate when the estimated displacement (e.g., displacement 320 of FIG. 3) of the probe tip is from about 100 nm to about 1000 nm. Where the tolerance on the displacement is about 10%, reducing the displacement rate at a threshold distance can reduce the risk of damage to the probe(s) and/or the sample surface resulting from undesired contact.

At operation 515, the example process 500 includes applying a voltage signal to the probe tip and/or to the surface of the sample. In some embodiments, operation 515 is omitted, as when an electrical property of the probe is monitored without applying an external voltage signal to probe tip, as when a signal is applied to the surface of the sample. The signal can be a periodic AC voltage signal that assumes the form of a sine wave or a sampled sine wave where a discretized function generator is used as part of the systems described herein. The periodic signal can also assume other waveforms, including but not limited to square waves, sawtooth waves, triangle waves, or others. As described in more detail in reference to FIG. 2, the periodic voltage signal can be applied (e.g., probe(s) 155 of FIG. 1), such that the signal propagates through the probe or from the surface to the probe tip. The periodic signal can include a bias voltage, such that the time-variant voltage signal oscillates about the bias voltage. The bias voltage can be a DC bias. The DC bias can be from about 100 mV to about 40 V, including subranges, fractions, and interpolations thereof. Advantageously, applying a DC bias to the probe tip as part of the periodic voltage signal can improve the signal-to-noise characteristics of capacitance data generated using measurements of the probe response signal, as described in more detail in reference to FIG. 2.

In some embodiments, the voltage signal includes multiple segments characterized by different respective frequencies. In an illustrative example, a periodic voltage signal can include a first segment at a first frequency from about 20 Hz to about 2 MHz and a second segment at a second frequency from about 600 MHz to about 3 GHz. In another example, the periodic voltage signal has multiple segments at the first frequency and multiple segments at the second frequency. In some cases, the segments at the first frequency alternate with segments at the second frequency. One or more segments can be generated at a third frequency different from the first frequency and/or the second frequency. In some embodiments, the periodic voltage signal is multiplexed, including frequency components of the first frequency, the second frequency, and/or the third frequency. To that end, signal processing techniques, such as frequency-space transforms and/or frequency-time transformations (e.g., Fourier-type transforms) can be used to demultiplex the response signal and process multiple frequency components concurrently. Advantageously, two or more frequencies can be used to distinguish a conductive surface from a dielectric surface, thereby improving the performance of the example process and reducing the likelihood of an improperly positioned probe tip.

At operation 520, the example process 500 includes generating response data. The response data can be based at least in part on a response of the probe tip to the voltage signal (e.g., the response signal described in reference to FIG. 2). Generating response data can include measuring the dissipation factor, voltage/current, and/or frequency/phase/amplitude shifts concurrently with the displacement of the probe tip toward the surface of the sample. As described in reference to FIG. 2 and FIG. 6, the dissipation factor can be less than zero before contact with the surface of the sample and greater than zero after contact with the surface of the sample. In some embodiments, response data includes component values that can be derived from the response signal, including but not limited to internal voltage, current, phase, frequency shift, and amplitude change information. For example, the bulk conductivity of the probe and/or the probe tip can be used to detect contact with a conductive surface.

While operations 510, 515, and 520 are illustrated as being in a sequence, at least a portion of the operations can be reordered and/or performed concurrently or repeatedly (e.g., in multiple iterations, in a loop, etc., while monitoring the signals for any contact). For example, operation 515 can precede operation 510, can substantially coincide with operation 510, or can be undertaken at about the point where the displacement rate decreases to the "fine" displacement rate (e.g., D2 of FIG. 6). Similarly, operation 520 can precede operation 510, can substantially coincide with operation 515, and/or can be undertaken at about the point where the displacement rate decreases to the fine displacement rate.

At operation 525, the example process 500 includes detecting a contact between the sample surface and the probe tip. As described in reference to FIG. 2 and illustrated in reference to FIG. 6, the contact between the sample surface (e.g., surface 225 of FIG. 2) and the probe tip (e.g., probe tip 210 of FIG. 2) can be detected using capacitance data generated at operation 520. Rate of change of capacitance, absolute capacitance, and/or a change in the sign of the dissipation factor data can indicate a contact between the sample surface and the probe tip. This rate of change can be either with time and/or frequency. In some embodiments, dynamics in the capacitance of the probe can indicate a contact, for example, by including a period of high variability on contact followed by a stabilization over time. Similarly, proximity of the probe tip to the surface of the sample can be indicated by a shift in dissipation factor data (e.g., in the magnitude of the dissipation factor), which can occur when the probe tip nears the surface of the sample. Advantageously, detecting proximity can reduce the likelihood that the probe deviates from a target feature of the DUT surface.

In some embodiments, detecting contact on a surface can include monitoring a phase shift in response data, relative to the voltage signal, a baseline, or a reference signal, concurrent with displacing the probe toward the surface. In some cases, the phase shift can increase with increasing proximity of the probe tip to the surface, such that a contact is detected as the phase shift crosses a threshold value. In some embodiments, the threshold value is a value greater than zero. In some embodiments, the threshold value can approach a theoretical case of a pure capacitor, at which the phase shift between voltage and current signals is $\pi/2$, but can be a fraction of the theoretical value, including about $\pi/8$, about $\pi/4$, or the like.

Detecting contact on a dielectric surface can include varying and/or applying a higher DC bias to increase the strength of the field at the tip of the probe. Additionally and/or alternatively, peak to peak voltage, frequency scanning, varying measurement integration time, averaging over multiple measurements and/or frequencies, and differential measurements between different frequencies/amplitudes can be used to detect contact. For example, detecting the contact can include comparing capacitance data for a first segment at a first frequency with capacitance data for a second segment at a second frequency. The comparison can include establishing a baseline and/or reference capacitance data using the first segment response signal and/or by averaging capacitance measurement samples over multiple segments. In some cases, the baseline/reference data can be generated by modeling a reference trendline for the expected capacitance at a given displacement or over a range of displacements of the probe from the sample. Capacitance data generated for the second segment data can be compared with the reference data, with data for the first segment that has been baseline corrected, and/or with prior generated capacitance data for the second segment, as part of one or more approaches to detect contact with a dielectric surface as well as the quality of the contact.

To that end, example process 500 can include detecting a second displacement of the probe tip relative to the sample surface (e.g., D2 of FIG. 6). To that end, the dissipation factor data can be divided into multiple segments corresponding to displacement values relative to the sample surface. In this context, the first displacement, D1, refers to the position of the probe tip before displacement toward the surface of the sample. The second displacement, D2, in turn, refers to a position of the probe tip where a first derivative of the dissipation factor with respect to displacement (or time) changes from a negligible or zero value to a nonzero positive value. A third displacement, D3, corresponds to the contact between the probe tip and the surface of the sample, and as such D3 is substantially equal to zero.

FIG. 6 is a composite graph showing example data for an integrated circuit testing system implementing the example process of FIG. 5, in accordance with some embodiments of the present disclosure. The composite graph includes a dual-axis graph with time on the abscissa, displacement data 605 on a first ordinate (left), corresponding to a position of a probe tip in a dimension normal to a surface of a sample, and dissipation factor data 610 on a second ordinate (right), derived from a response signal measured from the probe in response to the application of the periodic voltage signal 620.

The abscissa is segmented by four displacement values, D0-D3, as described in reference to FIG. 5. The displacement data 605 is supplemented by tolerance data 615, reflecting an uncertainty in the position of the probe tip that is attributable at least in part to an open loop positioning technique. The composite graph also includes periodic voltage signal 620 waveforms at a first frequency 620 and at a second frequency 625. The data of FIG. 6 are not drawn to scale and as such do not represent real data, but rather are illustrative examples of the form of each data type, presented to aid the description of the techniques for detecting contact of a probe tip with a surface of a sample.

From the initial displacement D0 to the first displacement D1, the probe tip is brought to the first displacement D1, as described in reference to operation 505 of example process 500 of FIG. 5. At D1, corresponding to operation 510 of example process 500, the probe tip is displaced toward the surface of the sample, illustrated as a steady decrease in the displacement. Concurrent with displacing the probe tip, the periodic voltage signal is applied at one or more frequencies 620 and/or 625, as described in more detail in reference to FIG. 2 and operation 515 of example process 500. FIG. 6 shows the voltage signal in alternating mode to illustrate the two frequencies 620 and 625 more clearly. In some embodiments, more than two frequencies are used, and the frequencies can be provided concurrently and/or in alternating sequence.

A two-frequency technique can be used to detect contact and to determine whether contact is made between the probe tip 210 and a metal surface or a dielectric surface. In an illustrative example, at a given measurement position of the probe, response data, such as capacitance and/or dissipation data, are generated using the first frequency 620 and the second frequency 625. In this way, two or more sets of response data are generated for the position. Contact with a conductive material can be indicated by comparable/commensurate shifts observed in data for both frequencies, where conductive materials are relatively less sensitive to frequency than dielectric materials. In contrast, proximity and/or contact can be indicated by a relatively greater shift in higher frequency data than in lower frequency data. A system fault, such as DC current leak, can be indicated by a greater shift in lower frequency data than in higher frequency data.

The response signal, measured by one or more sensors (e.g., sensor 315 of FIG. 3, control circuitry 220 of FIG. 2) can be used to generate capacitance data that can include dissipation factor data 610, corresponding to operation 520 of example process 500. The dissipation factor data 610 is illustrated as a negative value from D1 to D3, with the second displacement, D2, substantially corresponding to a displacement at which the dissipation factor data 610 increase in value toward zero (e.g., decreasing in magnitude). D2 can also correspond to a displacement at which the probe tip displacement rate decreases from a relatively faster "coarse" rate to a relatively slower "fine rate." In some embodiments, however, the shift from "coarse" to "fine" displacement can be based at least in part on the nominal displacement data 605 reaching a threshold value, such as about 100 nm to about 500 nm, including subranges, fractions, and interpolations thereof. The third displacement, D3, corresponds to the contact of the probe tip with the surface of the sample (e.g., DUT 125 of FIG. 1). At D3, the value of the dissipation factor is about equal to zero. In some embodiments, detecting the contact point at D3 is facilitated by determining a change in sign of the dissipation factor data 610, corresponding to operation 525 of example process 500.

D2 coincides in FIG. 6 with the lower bound of the tolerance data 615 reaching a value of zero displacement. In some embodiments, however, D2 does not coincide with the lower bound of the tolerance data 615 in this way, but rather is determined using the rate of change (e.g., first derivative) of the dissipation factor data 610 increasing from substantially zero to a nonzero value. Illustrated in the compound graph of FIG. 6 is a continuation of the displacement of the probe tip past the third displacement, D3. The increasing value of the dissipation factor data 610 reflects an improvement in the quality of the contact with increasing contact force as the probe tip is lowered into the surface (e.g., feature 235 of FIG. 2) and reducing contact resistance.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described. While example embodiments described herein center on integrated circuit testing systems, and multi-probe systems in particular, these are meant as non-limiting, illustrative embodiments. Embodiments of the present disclosure are not limited to such embodiments, but rather are intended to address analytical instruments systems for which a wide array of material samples can be analyzed by probes of the present disclosure.

Some embodiments of the present disclosure include a system including one or more data processors and/or logic circuits. In some embodiments, the system includes a non-transitory computer readable storage medium containing instructions which, when executed on the one or more data processors and/or logic circuits, cause the one or more data processors and/or logic circuits to perform part or all of one or more methods and/or part or all of one or more processes and workflows disclosed herein. Some embodiments of the present disclosure include a computer-program product tangibly embodied in non-transitory machine-readable storage media, including instructions configured to cause one or more data processors and/or logic circuits to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claims. Thus, it should be understood that although the present disclosure includes specific embodiments and optional features, modification and variation of the concepts herein disclosed may be resorted to by those skilled in the art, and that such modifications and variations are considered to be within the scope of the appended claims.

Where terms are used without explicit definition, it is understood that the ordinary meaning of the word is intended, unless a term carries a special and/or specific meaning in the field of charged particle microscopy systems or other relevant fields. The terms "about" or "substantially" are used to indicate a deviation from the stated property within which the deviation has little to no influence of the corresponding function, property, or attribute of the structure being described. In an illustrated example, where a dimensional parameter is described as "substantially equal" to another dimensional parameter, the term "substantially" is intended to reflect that the two parameters being compared can be unequal within a tolerable limit, such as a fabrication tolerance or a confidence interval inherent to the operation of the system. Similarly, where a geometric parameter, such as an alignment or angular orientation, is described as "about" normal, "substantially" normal, or "substantially" parallel, the terms "about" or "substantially" are intended to reflect that the alignment or angular orientation can be different from the exact stated condition (e.g., not exactly normal) within a tolerable limit. For dimensional values, such as diameters, lengths, widths, or the like, the term "about" can be understood to describe a deviation from the stated value of up to ±10%. For example, a dimension of "about 10 mm" can describe a dimension from 9 mm to 11 mm.

The description provides exemplary embodiments, and is not intended to limit the scope, applicability or configuration of the disclosure. Rather, the ensuing description of the exemplary embodiments will provide those skilled in the art with an enabling description for implementing various embodiments. It is understood that various changes may be made in the function and arrangement of elements without departing from the spirit and scope as set forth in the appended claims. Specific details are given in the description to provide a thorough understanding of the embodiments. However, it will be understood that the embodiments may be practiced without these specific details. For example, specific system components, systems, processes, and other elements of the present disclosure may be shown in schematic diagram form or omitted from illustrations in order not to obscure the embodiments in unnecessary detail. In other instances, well-known circuits, processes, components, structures, and/or techniques may be shown without unnecessary detail.

What is claimed is:

1. A computer-implemented method for detecting nanoscale contact of a probe tip on a surface, the method comprising:
    positioning a probe tip at a first displacement relative to a sample surface, the sample surface exposing one or more nanostructures;
    displacing the probe tip toward the sample surface;
    generating response data for the probe tip comprising measuring one or more electrical properties of the probe tip, concurrent with displacing the probe tip; and
    detecting a contact between the sample surface and the probe tip using the response data, comprising detecting a change in sign of the response data.

2. The computer-implemented method of claim 1, wherein the response data comprise dissipation factor data and wherein detecting the contact comprises detecting a change in sign of the dissipation factor.

3. The computer-implemented method of claim 2, further comprising detecting a second displacement of the probe tip relative to the sample surface for which:
    a rate of change of the dissipation factor is negligible or zero between the first displacement and the second displacement; and
    the rate of change of the dissipation factor is positive between the second displacement and the sample surface.

4. The computer-implemented method of claim 3, wherein displacing the probe tip comprises:
    displacing the probe tip by a first displacement rate between the first displacement and the second displacement; and
    displacing the probe tip by a second displacement rate between the second displacement and the sample surface,
    wherein the second displacement rate is different from the first displacement rate.

5. The computer-implemented method of claim 1, further comprising applying a voltage signal to the probe tip, the voltage signal being a periodic AC signal, an aperiodic AC signal, or a DC signal.

6. The computer-implemented method of claim 5, wherein the voltage signal has a frequency from about 20 Hz to about 2 MHz or 600 MHz to about 3 GHz.

7. The computer-implemented method of claim 5, wherein the voltage signal comprises a first segment having a first frequency and a second segment having a second frequency, and wherein detecting the contact comprises comparing response data for the first segment with response data for the second segment.

8. The computer implemented method of claim 1, wherein a voltage signal is applied to the sample and emanates an electric field from the sample surface.

9. The computer-implemented method of claim 1, wherein the nanostructures comprise a quantum dot.

10. The computer-implemented method of claim 1, wherein the nanostructures comprise an integrated circuit feature.

11. A system for electrical characterization of integrated circuit components, the system comprising:
  a probe defining a probe tip;
  an electronic test system electronically coupled with the probe, the electronic test system comprising:
  control circuitry; and
  one or more non-transitory machine-readable storage media, electronically coupled with the control circuitry, the media storing instructions that, when executed by the control circuitry, cause the electronic test system to perform operations comprising:
    positioning the probe tip at a first displacement relative to a sample surface, the sample surface exposing an integrated circuit component;
    displacing the probe tip toward the sample surface;
    applying a voltage signal to the probe tip;
    generating response data for the probe tip based at least in part on a response of the probe tip to the voltage signal, concurrent with displacing the probe tip; and
    detecting a contact between the sample surface and the probe tip using the response data, comprising detecting a change in sign of the response data.

12. The system of claim 11, wherein the response data comprise dissipation factor data, and wherein detecting the contact comprises detecting a change in sign of the dissipation factor.

13. The system of claim 12, wherein the response data comprise phase-shift data, and wherein detecting the contact comprises detecting a phase shift greater than or equal to a threshold value.

14. The system of claim 12, further comprising detecting a second displacement of the probe tip relative to the sample surface for which:
  a rate of change of the dissipation factor is negligible or zero between the first displacement and the second displacement; and
  the rate of change of the dissipation factor is positive beyond the second displacement.

15. The system of claim 11, wherein displacing the probe tip comprises:
  displacing the probe tip by a first displacement rate between the first displacement and the second displacement; and
  displacing the probe tip by a second displacement rate between the second displacement and the sample surface,
  wherein the second displacement rate is different from the first displacement rate.

16. The system of claim 11, wherein the voltage signal comprises a periodic voltage signal, and wherein the periodic voltage signal has a frequency greater from about 20 Hz to about 2 MHz or from about 600 MHz to about 3 GHz.

17. The system of claim 11, wherein the response data comprise frequency data, amplitude data, voltage data, current data, or Q-factor data.

18. The system of claim 11, wherein the voltage signal comprises a DC bias from about 100 mV to about 40V.

19. The system of claim 11, wherein the voltage signal comprises a first segment having a first frequency and a second segment having a second frequency, and wherein detecting the contact comprises comparing response data for the first segment with response data for the second segment.

20. The system of claim 19, further comprising determining whether the surface of the sample is dielectric or conducting based at least in part on a comparison of the response data for the first segment with the response data for the second segment.

* * * * *